(12) United States Patent
Horie et al.

(10) Patent No.: US 6,280,489 B1
(45) Date of Patent: Aug. 28, 2001

(54) POLISHING COMPOSITIONS

(75) Inventors: Yuji Horie; Hiromitsu Okuyama; Mitsuo Otohata, all of Tokyo (JP)

(73) Assignee: Nihon Micro Coating Co., Ltd. (JP)

( * ) Notice: Subject to any disclaimer, the term of this patent is extended or adjusted under 35 U.S.C. 154(b) by 0 days.

(21) Appl. No.: 09/431,347

(22) Filed: Oct. 29, 1999

(51) Int. Cl.$^7$ .............................. C09K 3/14; C09G 1/02
(52) U.S. Cl. ................... 51/307; 51/309; 106/3; 106/8
(58) Field of Search .............. 51/307, 309, 308; 100/3, 8; 438/692, 693; 252/79.1; 510/397, 436

(56) References Cited

U.S. PATENT DOCUMENTS 4,614,606 * 9/1986 Machin et al. .................. 510/397
5,089,053 * 2/1992 Chou et al. ........................ 134/7

* cited by examiner

*Primary Examiner*—Michael Marcheschi
(74) *Attorney, Agent, or Firm*—Coudert Brothers

(57) ABSTRACT

Polishing compositions with phosphoric ester added to a suspension containing abrasive particles can have an improved ability to have the abrasive particles dispersed again after they are left for an extended period of time such that the particles may have condensed into aggregates. Those with abrasive particles such as diamond powder dispersed in an aqueous solution containing a glycol compound, metallic salt of a higher aliphatic acid and phosphoric ester have an improved polishing ability.

2 Claims, 2 Drawing Sheets

POLISHING COMPOSITIONS

BACKGROUND OF THE INVENTION

This invention relates to polishing compositions for polishing, or grinding, the surface of a solid material such as wood, metal, glass and plastic materials. More particularly, this invention relates to such polishing compositions for high-precision polishing such as the polishing of end surfaces of optical fibers for telecommunication, the polishing of main surfaces of optical lenses, the texturing and polishing of magnetic hard disk substrates and the surface processing of silicon wafers.

Texturing processes for forming uniformly textured microscopic lines without scratches on the surface of a magnetic hard disk substrate used as a magnetic memory medium and polishing processes on end surfaces of optical fibers for connecting two of them together or optical fibers with an optical device, as the distance of transmission by optical fibers for telecommunication increases, are both being commonly practiced. For such high-precision polishing processes, use may be made of free abrasive particles, as well as a tape having abrasive particles attached to one of its surfaces to be pressed against the target surface, thereby causing the tape to run against the target surface. When the polishing is done by means of such free particles, the process is usually carried out by supplying a polishing composition containing abrasive particles to the target surface, and applying and moving a woven or non-woven polishing cloth or a polishing tape.

Conventionally used examples of such a polishing composition include suspensions having about 0.01–5 weight % of abrasive particles dispersed in an aqueous solution containing a surfactant at 1–20 weight %. The surfactant is used for preventing precipitation of the abrasive particles and dispersing them uniformly throughout the liquid. Polyalkylene glycol, sodium alkyl ether sulfonate, etc. are used for this purpose.

When a polishing process is carried out with free polishing particles, it is a common practice to retrieve a suitable amount of a polishing composition from a storage container. In other words, a polishing composition is usually used after it has been stored for a long period of time without even being touched. If a polishing composition is left for a long period of time without being touched in the meantime, the abrasive particles therein usually precipitate, condense and tend to form blocks having large diameters. If a polishing composition containing such condensed particles is used for a high-precision polishing process, unwanted scratches are likely to be produced on the target surface which is polished. In order to prevent such occurrences, it is a common procedure to subject the polishing composition to an ultrasonic disperser to break up such condensed blocks and to re-disperse the abrasive particles.

In other words, prior art polishing compositions were inconvenient to use because they required an extra equipment such as an ultrasonic disperser for re-dispersing condensed particles. Moreover, this requires extra manpower, involving extra work and time for the polishing and increasing the cost of the operation.

Even if an ultrasonic disperser may be used on a polishing composition which has been stored over a long period of time, condensed particles are still often observed within the polishing composition. If a polishing composition containing abrasive particles of diameters 0.3 $\mu$m is left for one week and an ultrasonic disperser is used thereon, many condensed particles with diameters greater than 0.3 $\mu$m are found inside the liquid, as indicated by Curve B' in FIG. 1. Since such condensed particles cause unwanted scratches on the target surface, prior art polishing compositions cannot be used reliably for a high-precision polishing process.

With the recent increase in the demand for high-capacity memory devices, the surface of a magnetic hard disk substrate must be given a uniform texturing of lines without scratches and finer than the surface roughness of the substrate after mirror polishing. There is a strong need for polishing compositions for a high-speed high-precision texturing of a substrate surface.

SUMMARY OF THE INVENTION

It is therefore an object of this invention to provide improved polishing compositions which are suitable for high-precision polishing and of which the abrasive particles can be dispersed again efficiently after having been left unused for a long time.

It is a further object of this invention to provide such polishing compositions having an improved polishing capability with which a high-precision polishing can be carried out at a faster rate.

Polishing compositions embodying this invention, with which the above and other objects can be accomplished, may be characterized as comprising a suspension containing abrasive particles and phosphoric ester. The presence of phosphoric ester at least in an amount of 0.2 weight % improves the ability of the composition to disperse the abrasive particles again even by simple means such manual shaking without the use of a dedicated equipment such as an ultrasonic disperser, after it has been left over an extended period. Polishing compositions comprising an aqueous solution containing a glycol compound, metallic salt of a higher aliphatic acid and phosphoric ester and abrasive particles, such as diamond powder, dispersed in said aqueous solution have an improved polishing ability.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

DETAILED DESCRIPTION OF THE INVENTION

Figure 1:
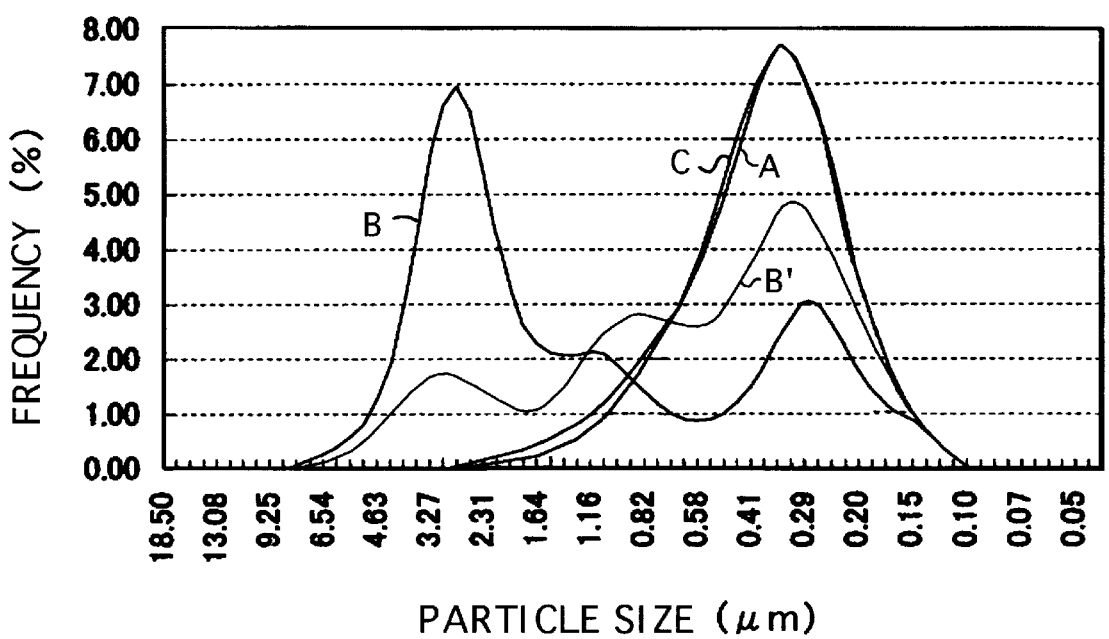
FIG. 1 is a graph showing distribution of granularity, or particle diameters, of various polishing compounds at different stages of their use.

The invention is described next by way of examples.

Polishing compositions according to a first embodiment of this invention, with an improved ability to disperse abrasive particles again and adapted for use in high-precision polishing, are obtained by adding a phosphoric ester to a suspension in which abrasive particles are dispersed and stirring the mixture. Such a suspension may be considered similar to what is currently being used as polishing compositions for polishing with free abrasive particles, obtained by dispersing abrasive particles within an aqueous solution containing a surfactant. This aqueous solution may additionally contain glycol compounds and higher aliphatic amides in order to further prevent the precipitation of the abrasive particles and to slow down the precipitation and condensation of the abrasive particles inside the polishing composition. Examples of the abrasive particles to be dispersed include microscopic particles of alumina, diamond and silicon carbide with diameters in the range from 0.1 μm to several tens of μm which are commonly used for high-precision polishing. The phosphoric esters to be used according to this invention are esters which are obtained by substituting the hydrogen atoms of phosphoric acid ($H_3PO_4$) with the alkyl group or the allyl group and are commonly used as an agent for preventing coloring or a flame retardant for resins. The amount of phosphoric ester to be added to the suspension containing abrasive particles is such that it will be 0.2–2.0 weight % of the polishing compound as a whole. Table 1 shows examples of polishing compositions having a phosphoric ester added to a suspension obtained by dispersing alumina particles in an aqueous solution containing a surfactant, a glycol compound and a higher aliphatic amide.

TABLE 1

| Component | Content |
| --- | --- |
| Pure water | 65–95 weight % |
| Alumina particles | 0.5–15 weight % |
| Glycol compound | 1–15 weight % |
| Higher aliphatic amide | 0.2–2 weight % |
| Non-ionic surfactant | 0.2–2 weight % |
| Phosphoric ester | 0.2–2 weight % |

Polishing compositions according to a second embodiment of this invention, with an increased polishing power and capable of high-precision polishing in a reduced time, are obtained by adding and stirring abrasive particles to disperse them in an aqueous solution containing a glycol compound, metallic salt of higher aliphatic acid such as oleic acid and a phosphoric ester. Microscopic powders of alumina, diamond, silicon carbide, cerium oxide and colloidal silica with diameters in the range from 0.01 μm to several tens of μm which are commonly used for high-precision polishing may be used as the abrasive particles. Where an even higher polishing power is required such as in a texturing process for forming extremely fine textured lines on the surface of a magnetic hard disk substrate, it is preferred to use diamond particles with diameters in the range from 0.05 μm to 10 μm. The abrasive particles should be about 0.01–0.5 weight % of the polishing composition as a whole.

Table 2 shows examples of polishing compositions according to the second embodiment of the invention, having fine diamond particles as abrasive particles.

TABLE 2

| Component | Content |
| --- | --- |
| Pure water | 65–95 weight % |
| Diamond particles | 0.01–0.5 weight % |
| Glycol compound | 0.4–4 weight % |
| Metallic salt of higher aliphatic acid | 0.8–8 weight % |
| Phosphoric ester | 0.8–8 weight % |

The polishing compositions according to the second embodiment of the invention also have an improved ability to re-disperse abrasive particles after they are precipitated because they contain a phosphoric ester as do the polishing compositions according to the first embodiment of the invention described above.

The merits of this invention are demonstrated next by way of comparisons with prior art compositions. For a first comparison experiment, Test Sample 1 according to the first embodiment of the invention, with the composition shown in Table 3, was prepared by using alumina powder as abrasive particles, and its ability to disperse the abrasive particles again was compared with that of a prior art composition.

TABLE 3

| Component | Content |
| --- | --- |
| Pure water | 85 weight % |
| Alumina particles (diameter 0.3 μm) | 5 weight % |
| Glycol compound | 7 weight % |
| Higher aliphatic amide | 1 weight % |
| Non-ionic surfactant | 1 weight % |
| Phosphoric ester | 1 weight % |

For this comparison experiment, microscopic alumina powder of particle diameter 0.3 μm was decomposed by means of an ultrasonic disperser until no particle aggregates could be observed, and its granularity distribution, or its original natural distribution of its granularity distribution was measured. This measured distribution is shown by Curve A in FIG. 1. Next, a suspension of abrasive particles was prepared as a prior art polishing composition by adding 5 weight % of alumina powder with particle diameter 0.3 μm to an aqueous solution with 85 weight % of pure water, 7 weight % of glycol compound, 1 weight % of high aliphatic amide and 1 weight % of a non-ionic surfactant and stirring the mixture by means of a mixer. After the suspension thus prepared was left for one week, it was transferred into a suitable container and shaken manually. Its measured granularity distribution is shown by Curve B in FIG. 1. Its granularity distribution was also measured after it was subjected to an ultrasonic disperser for 5 minutes. The result is shown by Curve B' in FIG. 1.

Test Sample 1 was obtained by adding 1 weight % of phosphoric ester to this prior art suspension and stirring the mixture. Test Sample 1 thus obtained was similarly left for one week, transferred to a suitable container and shaken manually, and its granularity distribution was measured. The measured distribution is shown by Curve C. It is noteworthy that Curve C represents a relatively concentrated distribution around the particle diameter of 0.3 μm and approximately matches Curve A representing the original distribution. By contrast, Curve B shows a much extended distribution in particle diameters from about 0.3 μm up to about 3.0 μm which is 10 times as large as the original diameter of the abrasive particles, indicating that the abrasive particles have precipitated and condensed. Curve B' also shows an equally extended distribution from about 0.3 μm to about 3.0 μm. This comparison experiment clearly shows that the abrasive particles in Test Sample 1 embodying this invention can be dispersed again even after it is left for a long period of time and even by a simple operation such as shaking manually such that no aggregate of condensed particles will remain observable. In other words, it is clearly seen that the addition of phosphoric ester has a surprising effect of significantly improving the ability to disperse the abrasive particles again after the composition is left over a long period of time.

For a second comparison experiment, Test Sample 2 according to this invention and another prior art polishing composition using diamond powder as its abrasive particles were prepared and used for the texturing of surfaces of aluminum disks to compare their polishing abilities and the degrees of obtained surface roughness. The polishing composition of Test Sample 2 was prepared by adding 4.4 weight % of phosphoric ester to an aqueous solution with 89 weight % of pure water, 2.1 weight % of glycol compound and 4.4 weight % of higher aliphatic amide, further adding 0.1 weight % of diamond powder with diameter 0.5 μm, as summarized in Table 4, and stirring the mixture by means of a mixer. The prior art polishing composition was prepared by adding 0.1 weight % of diamond powder with diameter 0.5 μm to an aqueous solution with 89 weight % of pure water, 2.1 weight % of glycol compound, 4.4 weight % of metallic salt of higher aliphatic acid and 4.4 weight % of high aliphatic amide and stirring the mixture by means of a mixer.

TABLE 4

| Component | Content |
| --- | --- |
| Pure water | 89 weight % |
| Diamond particles (diameter 0.5 μm) | 0.1 weight % |
| Glycol compound | 2.1 weight % |
| Higher aliphatic amide | 4.4 weight % |
| Phosphoric ester | 4.4 weight % |

Figure 2:
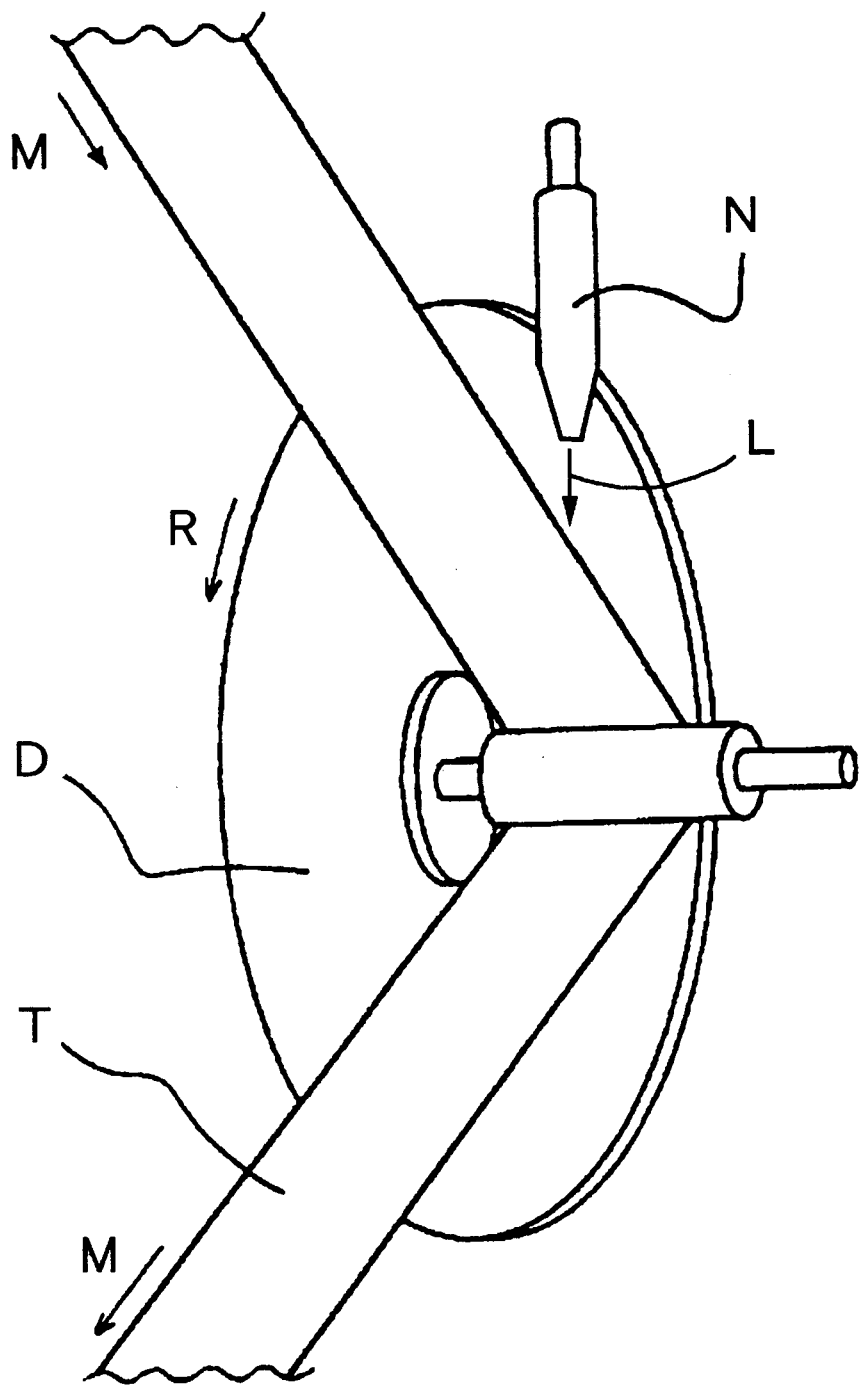
FIG. 2 is a schematic sketch of a texturing device for the texturing of a surface by using a polishing composition of this invention.

FIG. 2 shows schematically a texturing device used for the texturing of the surfaces of aluminum disks for this comparison experiment, by supplying a polishing compound L through a nozzle N to the rotating surface of a disk D while causing a tape T pressed against the surface of this disk D to travel in a direction M opposite the direction of rotation R of the disk D. The surface roughness $R_a$ of the disk D before the texturing was 8Å–11Å. The target surface roughness to be obtained by the texturing was set to be about 6.0Å and the polishing ability was measured in terms of the polished amount (referred to as the "stock removal") per unit time in units of mg/min. Formation of scratches on the disk surface after the texturing process was also studied visually by means of a microscope. Table 5 summarizes the conditions of this texturing process.

TABLE 5

| Conditions of texturing | |
| --- | --- |
| Number of disk rotations | 200 rpm |
| Travel speed of tape | 10 cm/min |
| Supply rate of polishing compound | 10 cc/min |

The results of the second comparison experiment are summarized in Table 6.

TABLE 6

| | Polishing ability (Stock removal) | Surface roughness (Ra) | Scratches |
| --- | --- | --- | --- |
| Test Sample 2 | 9.6 mg/min | 6.2Å | Not observable by microscope |
| Prior art polishing compound for comparison | 6.2 mg/min | 6.3Å | Some observed by microscope |

Table 6 shows that the polishing ability increased by about 50% if the polishing compound of this invention (Test Sample 2) is used for the texturing. Although the surface roughness was about the same, the polishing compound of this invention could produce more uniform textured lines without unwanted scratches. It was also observed that the prior art polishing compound used for this comparison had an alkaline odor but Test Sample 2 was odorless.

In summary, polishing compounds according to this invention are characterized as containing an phosphoric ester and the abrasive particles contained therein can be dispersed again, even after the compound has been left for an extended length of time, to such a degree that no aggregate of condensed particles is observed and hence as being usable for a high-precision and uniform texturing without producing any unwanted scratches on the target surface to be polished. By using a polishing composition of this invention containing glycol compound, metallic salt of higher aliphatic acid and phosphoric ester, an improved polishing ability (as measured by the stock removal) can be achieved.

What is claimed is:

1. A polishing composition comprising:

an aqueous solution containing 65–95 weight % of water, 0.4–4 weight % of a glycol compound, 0.8–8 weight % of metallic salt of a higher aliphatic acid and 0.8–8 weight % of phosphoric ester; and 0.01–0.5 weight % of abrasive particles dispersed in said aqueous solution.

2. The polishing composition of claim 1 wherein said abrasive particles comprise diamond particles.

* * * * *